US011683758B2

(12) United States Patent
Lee et al.

(10) Patent No.: US 11,683,758 B2
(45) Date of Patent: Jun. 20, 2023

(54) REDUCED POWER CONSUMPTION OF REDCAP UE IN PDCCH MONITORING

(71) Applicant: Nokia Technologies Oy, Espoo (FI)

(72) Inventors: Gilsoo Lee, Lisle, IL (US); Nitin Mangalvedhe, Hoffman Estates, IL (US); Rapeepat Ratasuk, Inverness, IL (US); Xiaomao Mao, Paris (FR); ManHung Ng, Swindon (GB)

(73) Assignee: Nokia Technologies Oy, Espoo (FI)

( * ) Notice: Subject to any disclaimer, the term of this patent is extended or adjusted under 35 U.S.C. 154(b) by 125 days.

(21) Appl. No.: 17/470,037

(22) Filed: Sep. 9, 2021

(65) Prior Publication Data

US 2023/0075545 A1 Mar. 9, 2023

(51) Int. Cl.
*H04W 52/02* (2009.01)
*H04L 27/26* (2006.01)

(52) U.S. Cl.
CPC ..... *H04W 52/0229* (2013.01); *H04L 27/2676* (2013.01)

(58) Field of Classification Search
CPC . H04L 27/2676; H04L 5/0053; H04L 5/0094; H04W 52/0229; Y02D 30/70
See application file for complete search history.

(56) References Cited

U.S. PATENT DOCUMENTS

2022/0030559 A1* 1/2022 Taherzadeh Boroujeni ................ H04L 5/0053

FOREIGN PATENT DOCUMENTS

WO WO-2022152037 A1 * 7/2022

* cited by examiner

*Primary Examiner* — Marcos L Torres
(74) *Attorney, Agent, or Firm* — Harrington & Smith

(57) ABSTRACT

Example embodiments of the invention provide at least a method an apparatus to perform reporting, by the apparatus, information comprises an indication of at least one aggregation level for a performance target of a physical downlink control channel; receiving, from a network node of the communication network, an assignment for a search space set comprising at least one physical downlink control channel candidate; and based on the assignment, performing blind detection of a physical downlink control channel on the at least one assigned physical downlink control channel candidate. Further, to perform at least determining by a network node of a communication network for user equipment of the communication network information comprising at least one aggregation level for a performance target of at least one physical downlink control channel candidate and of an assigned search space set; and communicating towards the user equipment information comprising an assignment for a search space set comprising at least one physical downlink control channel candidate for performing blind detection of a physical downlink control channel on the at least one physical downlink control channel candidate.

15 Claims, 4 Drawing Sheets

REDUCED POWER CONSUMPTION OF REDCAP UE IN PDCCH MONITORING

TECHNICAL FIELD

The teachings in accordance with the exemplary embodiments of this invention relate generally to reducing power consumption in physical downlink control channel monitoring and, more specifically, relate to reduced power consumption for reduced capacity user equipment in physical downlink control channel monitoring.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ACK: Acknowledgement
AL: Aggregation Level
BD: Blind detection or Blind decoding
BLER: block error ratio
CCE: control channel element
DCI: Downlink Control Indicator
DMRS: demodulation reference signal
gNB: gNodeB
MAC: Media Access Control
MAC CE: MAC Control Element
NPDCCH narrowband physical downlink control channel
NW network
OFDM: orthogonal frequency-division multiplexing
PDCCH: physical downlink control channel
PDSCH: Physical Downlink Shared Channel
PRB: physical resource block
PUSCH: Physical Uplink Shared Channel
RE: resource element
REDCAP: Reduced Capability
REG: resource element group
TTI: Transmission Time Interval
UE: User Equipment
SS: Search Space At the time of this application, as the demand for radio access continues to increase, there exists a need for further improvements in different aspects of communication systems including improving data rate, latency, reliability, and/or mobility for wireless communication for cellular wireless communication systems, such as for 5G NR. Such improvements relate to operation communication improvements for reduced capability (RedCap) devices.

Example embodiments of the invention work to further improve such operations.

SUMMARY

This section contains examples of possible implementations and is not meant to be limiting.

In an example aspect of the invention, there is an apparatus, such as a user equipment apparatus, comprising: at least one processor; and at least one non-transitory memory including computer program code, where the at least one non-transitory memory and the computer program code are configured, with the at least one processor, to cause the apparatus to at least: report, by the apparatus, information comprising an indication of at least one aggregation level for a performance target of a physical downlink control channel; receive, from a network node of the communication network, an assignment for a search space set comprising at least one physical downlink control channel candidate; and based on the assignment, perform blind detection of the physical downlink control channel on the at least one assigned physical downlink control channel candidate.

In another example aspect of the invention, there is a method comprising: report, by the apparatus, information comprising an indication of at least one aggregation level for a performance target of a physical downlink control channel; receive, from a network node of the communication network, an assignment for a search space set comprising at least one physical downlink control channel candidate; and based on the assignment, performing blind detection (i.e., monitoring) of a physical downlink control channel on the at least one assigned physical downlink control channel candidate.

A further example embodiment is an apparatus and a method comprising the apparatus and the method of the previous paragraph, wherein the apparatus comprises a reduced capability user equipment, wherein the at least one aggregation level comprises a minimum aggregation level, and wherein the assigned search space set comprising the at least one physical downlink control channel candidate is based on the minimum aggregation level, wherein the performance target is based on at least one of: a minimum aggregation level corresponding to target block error ratio on a narrowband physical downlink control channel, or a number of repetitions corresponding to target block error ratio on a physical downlink control channel, wherein at least one control resource set for performing blind detection of the physical downlink control channel on the at least one assigned physical downlink control channel candidate is not larger than an available bandwidth of the apparatus, wherein the assigned search space set comprises one subset of mutually exclusive subsets, and wherein based on the minimum aggregation level, the mutually exclusive subsets are predetermined from the network node, wherein the mutually exclusive subsets are statically partitioned in the at least one physical downlink control channel candidate, wherein the mutually exclusive subsets comprise at least one candidate predetermined set for the apparatus, wherein the at least one candidate predetermined set comprises at least one of at least one deterministic predetermined set or at least one randomized predetermined set assigned to the apparatus, wherein the at least one deterministic predetermined set comprises a static partitioning of physical downlink control channel candidates independent of the apparatus, wherein the at least one deterministic predetermined set is identified for different control channel elements of the at least one aggregation level, wherein the at least one randomized predetermined set allows the apparatus to add a random number of adjacent candidates such that the apparatus can interpret the candidates included in the at least one candidate predetermined set, wherein the at least one randomized predetermined set is defined using a random variable N, wherein the blind detection increases with an increment of a realization value of the random variable N, wherein the blind detection comprises receiving from the network node a delta signal informing the apparatus to use the at least one randomized predetermined set with a preceding (−1) or a following (+1) index compared to a previous predetermined set used by the apparatus, wherein there is identifying the at least one physical downlink control channel candidate in the assigned search space set that are valid for the user equipment, wherein the identifying is using at least one of: a hash function, a common predetermined set mapping assigned by the network node as determined by the user equipment, an index of the mutually exclusive subsets determined by the user equipment, a logical channel identifier associated with a medium access control element, a downlink control indicator, or system information, wherein the at least one non-transitory memory and the computer program code are configured, with the at least one processor, to cause the apparatus to set an early-stopping indicator for blind detection running on the apparatus, and/or wherein once the early-stopping indicator is set blind detection is stopped by the apparatus after the apparatus successfully decodes the physical downlink control channel from the at least one assigned physical downlink control channel candidate.

A non-transitory computer-readable medium storing program code, the program code executed by at least one processor to perform at least the method as described in the paragraphs above.

In another example aspect of the invention, there is an apparatus comprising: means for reporting, by the apparatus, information comprising an indication of at least one aggregation level for a performance target of a physical downlink control channel; means for receiving, from a network node of the communication network, an assignment for a search space set comprising at least one physical downlink control channel candidate; and means, based on the assignment, for performing blind detection of the physical downlink control channel on the at least one assigned physical downlink control channel candidate.

In accordance with the example embodiments as described in the paragraph above, at least the means for reporting, receiving, and performing comprises a network interface, and computer program code stored on a computer-readable medium and executed by at least one processor.

In an example aspect of the invention, there is an apparatus, such as a network side apparatus, comprising: at least one processor; and at least one non-transitory memory including computer program code, where the at least one non-transitory memory and the computer program code are configured, with the at least one processor, to cause the apparatus to at least: determine by a network node of a communication network for user equipment of the communication network information comprising at least one aggregation level for a performance target of at least one physical downlink control channel candidate and of an assigned search space set; and communicate towards the user equipment information comprising an assignment for a search space set comprising the at least one physical downlink control channel candidate for performing blind detection of a physical downlink control channel on the at least one physical downlink control channel candidate.

In another example aspect of the invention, there is a method comprising: determining by a network node of a communication network for user equipment of the communication network information comprising at least one aggregation level for a performance target of at least one physical downlink control channel candidate and of an assigned search space set; and communicating towards the user equipment information comprising an assignment for a search space set comprising the at least one physical downlink control channel candidate for performing blind detection of a physical downlink control channel on the at least one physical downlink control channel candidate.

A further example embodiment is an apparatus and a method comprising the apparatus and the method of the previous paragraph, wherein the user equipment comprises a reduced capability user equipment, wherein the at least one aggregation level comprises a minimum aggregation level, and wherein the assigned search space set comprises the at least one physical downlink control channel candidate and is based on the minimum aggregation level, wherein at least one control resource set for performing blind detection of the physical downlink control channel on the at least one physical downlink control channel candidate is not larger than an available bandwidth of the user equipment, wherein the assigned search space set comprises one of the mutually exclusive subsets, and wherein based on the minimum aggregation level, the mutually exclusive subsets are predetermined at the network node, wherein the mutually exclusive subsets are statically partitioned in the at least one physical downlink control channel candidate, wherein the mutually exclusive subsets comprise at least one candidate predetermined set for the user equipment, wherein the at least one candidate predetermined set comprises at least one of at least one deterministic predetermined set or at least one randomized predetermined set assigned to the user equipment, wherein the at least one deterministic predetermined set comprise a static partitioning of the at least one physical downlink control channel candidate independent of the user equipment, wherein the at least one deterministic predetermined set is identified for different control channel elements of the at least one aggregation level, wherein the at least one randomized predetermined set allows the user equipment to add a random number of adjacent candidates such that the user equipment can interpret the candidates included in the at least one candidate predetermined set, wherein the at least one randomized predetermined set is defined using a random variable N, wherein the blind detection comprises sending by the network node to the user equipment signaling comprising a delta signal informing the user equipment to use the at least one randomized predetermined set with a preceding (−1) or a following (+1) index compared to a previous predetermined set used by the user equipment, and/or wherein based on the signaling the network node can schedule downlink control information preceding or following the at least one randomized predetermined set without the need for user equipment to blind detect all possible candidates.

A non-transitory computer-readable medium storing program code, the program code executed by at least one processor to perform at least the method as described in the paragraphs above.

In another example aspect of the invention, there is an apparatus comprising: means for reporting, by a user equipment of a communication network, information comprising channel state information; means for determining by a network node of a communication network for user equipment of the communication network information comprising at least one aggregation level for a performance target of at least one physical downlink control channel candidate and of an assigned search space set; and means for communicating towards the user equipment information comprising an assignment for a search space set comprising the at least one physical downlink control channel candidate for performing blind detection of a physical downlink control channel on the at least one physical downlink control channel candidate.

In accordance with the example embodiments as described in the paragraph above, at least the means for determining and communicating comprises a network interface, and computer program code stored on a computer-readable medium and executed by at least one processor.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiment of this invention, there is proposed at least a method and apparatus for reduced power consumption for reduced capacity user equipment in physical downlink control channel monitoring.

In a PDCCH generation, the modulated PDCCH symbols are mapped to the physical resources called as control channel elements (CCEs). By definition, CCE consists of 6 resource element groups (REGs). Also, REG is 1 physical resource block (PRB) in one OFDM symbol, including 9 Resource Elements (RE) for the PDCCH payload and 3 demodulation reference signal (DMRS) REs.

Figure 1:
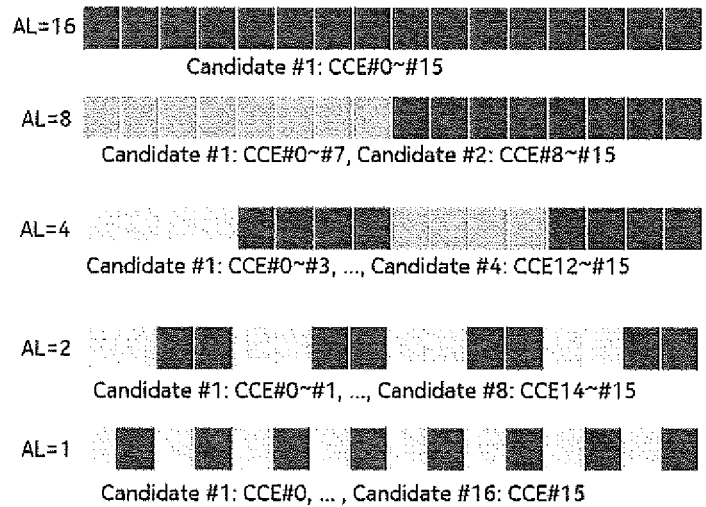
FIG. 1 shows an example of CCEs in different ALs.

Each DCI can have 1, 2, 4, 8, or 16 CCEs. The size of CCEs of a DCI can be varied by aggregation level (AL) defined in standards at the time of this application. For instance, FIG. 1 shows an example of CCEs in different ALs.

When the received PDCCH signal is decoded, UE has to attempt to decode all possible candidate CCEs. Since the power consumption increases with the number of BDs performed by UE, the exhaustive trials of a blind decoding (BD) or a blind detection (also BD) process may consume large power consumption in PDCCH monitoring. It is noted that these terms blind detection and blind decoding are non-limiting and can be used interchangeably in the application without limiting their alternate meaning.

To reduce the power consumption, it is possible to reduce the set size of the PDCCH candidates. The reducing PDCCH candidates is mentioned in agreements at the time of this application and includes:

Depending on the considered techniques, for scheme with reducing maximum number of PDCCH candidates, specification impact may include reducing the limit on maximum number of PDCCH candidates, and For dynamic adaptation of PDCCH BD parameters in connected mode, specification impacts may include mechanisms used to dynamically adapt PDCCH BD parameters e.g., maximum number of BDs per PDCCH monitoring occasion, span or slot and minimum time separation between two consecutive PDCCH monitoring occasions.

To perform BDs, UE is not explicitly informed of the detailed control channel structure. While UE is informed of the number of OFDM symbols in the control region of a subframe, the location of PDCCH is not provided. Therefore, UE must blindly decode the control region via trial-and-error process. Until the decoding is successful, the number of BD attempts can be large due to the different RNTIs, PDCCH candidates, DCI and PDCCH formats.

When the BDs are running on a RedCap UE device with a reduced computing capability and small battery capacity or a longer battery life requirement, to achieve longer battery life for a RedCap UE with reduced computing capability and small battery capacity, power consumption for BDs must be reduced. To this end, the decoding task can be simplified by using the reduced number of PDCCH candidates. Therefore, example embodiments of this invention introduce a new method to restrict the PDCCH candidates of individual RedCap UE while maintaining the PDCCH capacity and having a minimal impact on gNB's scheduling flexibility.

Unlike prior art at the time of this application, example embodiments of this invention provide that UE reports min AL and gNB assigns a subset of PDCCH candidates. Also, example embodiments of this invention introduce different options to explicitly/implicitly indicate the PDCCH candidate sets while defining the new messages required for the signaling flow between gNB and UE. Moreover, in example embodiments of this invention, the PDCCH candidate sets are defined in various ways.

Figure 4:
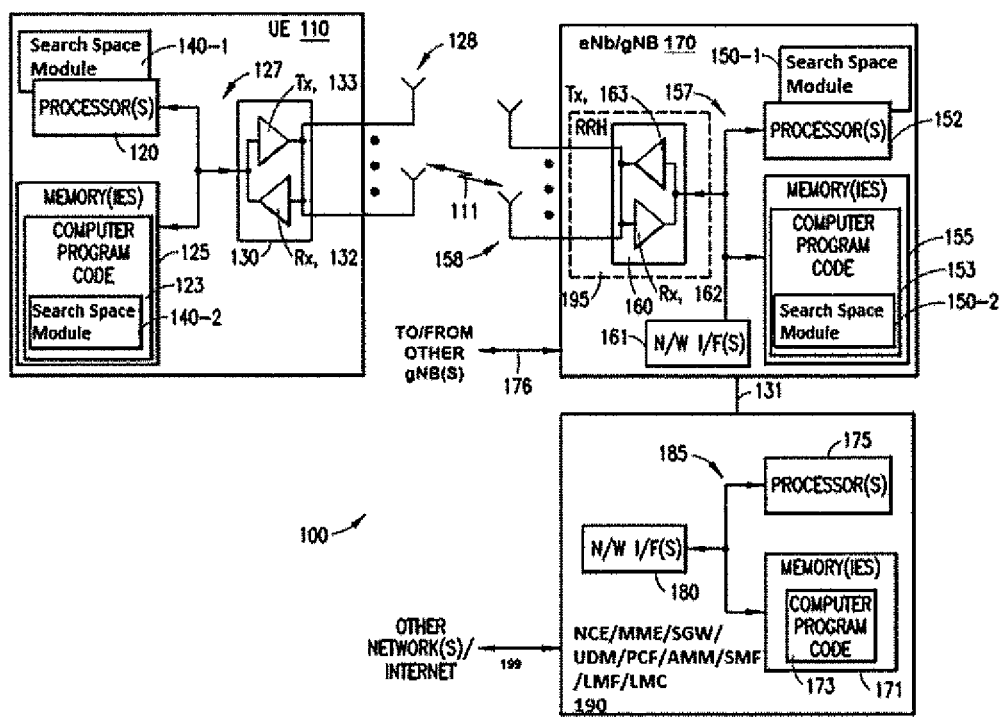
FIG. 4 shows a high level block diagram of various devices used in carrying out various aspects of the invention.

Before describing the example embodiments of the invention in further detail reference is made to FIG. 4. FIG. 4 shows a block diagram of one possible and non-limiting exemplary system in which the exemplary embodiments may be practiced.

As shown in FIG. 4, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include a search space 140 which is configured to perform the example embodiments of the invention as described herein. The search space module 140 may be implemented in hardware by itself of as part of the processors and/or the computer program code of the UE 110. The search space module 140 comprising one of or both parts 140-1 and/or 140-2, which may be implemented in a number of ways. The search space module 140 may be implemented in hardware as search space module 140-1, such as being implemented as part of the one or more processors 120. The search space module 140-1 may be implemented also as an integrated circuit or through other hardware such as a programmable gate array. In another example, the search space module 140 may be implemented as search space module 140-2, which is implemented as computer program code 123 and is executed by the one or more processors 120. Further, it is noted that the search space modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes an search space module 150 which is configured to perform example embodiments of the invention as described herein. The search space module 150 may comprise one of or both parts 150-1 and/or 150-2, which may be implemented in a number of ways. The search space module 150 may be implemented in hardware by itself or as part of the processors and/or the computer program code of the gNB 170. search space module 150-1, such as being implemented as part of the one or more processors 152. The search space module 150-1 may be implemented also as an integrated circuit or through other hardware such as a programmable gate array. In another example, the search space module 150 may be implemented as search space module 150-2, which is implemented as computer program code 153 and is executed by the one or more processors 152. Further, it is noted that the search space modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF/LMF/LMC 190 is configurable to perform operations in accordance with example embodiments of the invention in any of an L fb, NR, 5G and/or any standards based communication technologies being performed or discussed at the time of this application.

The gNB 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the UE 110 and/or gNB 170 for 5G and/or NR operations in addition to any other standards operations implemented or discussed at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, gNB 170, and/or NCE/MME/SGW/UDM/PCF/AMM/SMF/LMF/LMC 190 as in FIG. 4.

It is noted that functionality(ies), in accordance with example embodiments of the invention, of any devices as shown in FIG. 4 e.g., the UE 110 and/or gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 4 at least via the wireless link 111 and/or via the NCE/MME/SGW/UDM/PCF/AMM/SMF/LMF/LMC 190 using link 199 to Other Network(s)/Internet as in FIG. 4.

In general, various embodiments of the UE 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As similarly stated above, example embodiments of the invention introduce different options to explicitly/implicitly indicate the PDCCH candidate sets while defining the new messages required for the signaling flow between gNB and UE. Moreover, the PDCCH candidate sets are defined in various ways.

In the PDCCH monitoring, the BD process can arbitrarily consume a large power to find the location of DCI information among the PDCCH candidates. Example embodiments of this invention at least introduce a method to reduce the power consumption for PDCCH monitoring. In example embodiments of this invention, NW (gNB) assists RedCap UE to simplify the BD task by initially assigning a subset of the PDCCH candidates for each RedCap UE. The example embodiments of this invention are summarized as follows:

UE initially reports the minimum AL level to achieve certain performance in PDCCH. The UE's channel conditions determine the "min" AL. For instance, in NB-IoT, UE can report min AL as the number of repetitions that corresponds to 1% BLER on the PDCCH. The min AL is also determined by considering the UE complexity reduction features such as the impact of reduced Rx antennas and reduced processing capability;

It is noted that in this application the use of different terms predetermined set or preset is non-limiting and these terms predetermined set or preset may be used interchangeably in the application. All available PDCCH candidates can then be partitioned into the multiple mutually exclusive subsets, named as the candidate presets:

The preset definition can be either deterministic or randomized. Deterministic preset is a static partitioning of PDCCH candidates independent of the UE. When an index of the preset is sent to the UE, the UE explicitly knows the candidates in the assigned preset. Once a preset is assigned to the UE, some PDCCH candidates within the preset will be valid for a particular UE depending on the hash function, since the PDCCH candidates for the UE are changing every slot based on the hash function, and Randomized preset allows the UE to add a random number of adjacent candidates, and it allows the gNB to implicitly share the knowledge on the preset. For instance, when gNB indicates the index of the preset, the UE can flexibly interpret the candidates included in the preset. Alternatively, gNB can send a delta signal to inform UE that the UE should use the preset with the preceding (−1) or the following (+1) index compared to the previous preset used by the UE;

Based on the min AL reported by the UE, one of the PDCCH candidate presets is selected and assigned to the UE:

To reduce PDCCH blocking, when gNB, e.g., decides to use the same min AL for several UEs, it should try to distribute the presets among the UEs so that PDCCH blocking is minimized. A modulo function can be used to randomly assign UEs in the different presets, After gNB receives the min AL from LIE, gNB can set a max AL for the UE where max AL≥min AL. The assigned preset will include the candidates in the range between the min and max ALs. Note that, when the max AL is configured as max AL≥min AL, the configured min AL is based on what the UE reported to achieve its performance target, and higher ALs correspond to deteriorating conditions. Therefore, the assigned preset includes at least one fallback AL to support the case where UE's condition has deteriorated before it can be RRC reconfigured with a new preset. Alternately, to handle fast degradation in SNR, the preset can be applied only for UE-specific SS, and TIE uses full candidate set for cell-specific SS, and To support multiple PDCCH in one TTI, gNB can assign multiple candidate presets to one UE;

The assigned preset is sent to individual UE or group of UE devices. Our solution proposes three options (RRC, MAC CE, and two-stage DCI), enabling gNB to transmit the candidate preset; and gNB also sends an early-stopping indicator for BDs running on RedCap UE.

Definitions of PDCCH Candidate Preset

The PDCCH candidates are partitioned into the presets or predetermined sets. gNB can have a common preset mapping of how candidate space is divided into pre-sets. Then the common preset is applied to all UE devices served by the same gNB. Depending on the min AL value reported by UE, gNB assigns a preset of potential PDCCH candidates (search space locations) to UE. Since the PDCCH candidates for the UE are changing every slot based on the hash function, only some PDCCH candidates within the preset will be valid for a particular UE depending on the hash function. Therefore, the UE can attempt to decode the valid PDCCH candidates in the BD process.

Figure 2:
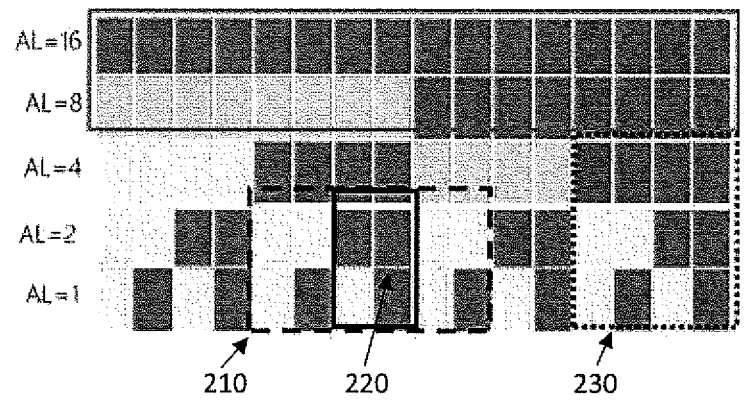
FIG. 2 shows boxes as examples of the presets or the partitioned PDCCH candidates.

The preset of the potential candidates is defined in the two different options: deterministic preset and randomized preset. First, the deterministic preset is a static partitioning of PDCCH candidates independent of the UE. For example, in FIG. 2, the CCEs highlighted in the small dashed-line box 230 are a preset. The preset in the small dashed-line box 230 of FIG. 2 can be assigned to UE that reports min AL=1 if the gNB decides the max AL is 4. The preset in the small dashed-line box 230 as in FIG. 2 includes 7 PDCCH candidates, i.e., 4 CCEs in AL=1, 2 CCEs in AL=2, and 1 CCE in AL=4.

Compared to the deterministic preset, randomized preset is designed to provide additional flexibility in PDCCH scheduling at the gNB. In that case, randomization is used to indicate the candidates in each preset. When a certain index of the candidate sets in the preset is sent to UE, it is assumed that the N neighboring sets are the target candidate sets where N is a random number. For instance, in FIG. 2, when the candidates in the solid-line box 220 are informed to UE, the candidates under the randomized preset definition become the large dashed-line box 210 of FIG. 2 including the additional neighboring candidates highlighted in the solid-line box 220.

The randomized preset can be defined in an alternative way. When a randomized preset is defined by using a random variable N, the BD efforts can increase with the increment of the realization value of N. Therefore, instead of using N to allow gNB scheduling flexibility, gNB can send a delta signal to inform UE that the UE should use the preset with the preceding (−1) or the following (+1) index compared to the previous preset used by the UE. In this way, gNB can still schedule DCI on preceding or following preset without the need for UE to BD all (2N+1) times of candidates.

When gNB already assigns the preset to UE, gNB may schedule PDCCH to multiple UE devices, and gNB may want to change the preset assignment for a particular UE. If the definition of deterministic preset is used, gNB must resend a signal to the UE to notify the change of the prior preset assignment.

However, if the randomized preset is used, neighboring candidates are additionally considered as the assigned candidates. gNB can use those additional neighboring candidates to send PDCCH without updating new preset assignment. Therefore, when the preset information (e.g., candidates in the solid-line box as in FIG. 2) is initially given to the UE, applying the randomized preset definition (large dashed-line box) enables gNB to flexibly schedule the PDCCH with more candidates than the deterministic preset definition (solid-line box as in FIG. 2).

Signaling Flow

Figure 3:
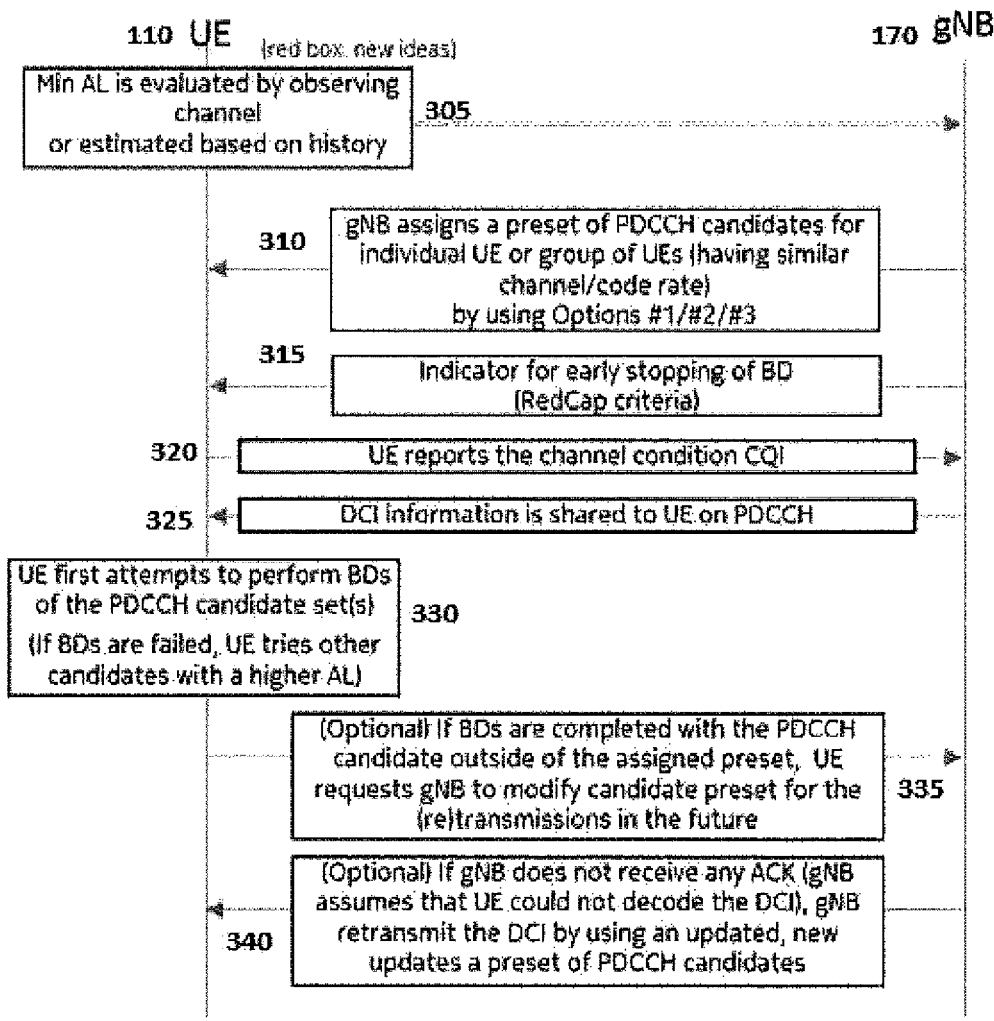
FIG. 3 shows a message exchange between gNB and UE to implement the PDCCH candidate preset in accordance with example embodiments of the invention.

As previously indicated FIG. 3 shows a message exchange between gNB and UE to implement the PDCCH candidate preset in accordance with example embodiments of the invention.

To apply the definitions of the PDCCH candidate preset, new signaling flow is required for information exchange between gNB and UE. The detailed steps shown in FIG. 3 are explained as follows:

1. As shown in step 305 of FIG. 3 the UE 110 evaluates the min AL value, and the min AL is sent to gNB. In this step, UE initially reports the minimum AL level to achieve certain performance in PDCCH. The UE's channel conditions determine the "min" AL since smaller ALs are not sufficient for desired performance whereas larger ALs are fine. For instance, in NB-IoT, UE can report min AL as the number of repetitions that corresponds to 1% BLER on the NPDCCH. The min AL is also determined by considering the UE complexity reduction features such as the impact of reduced Rx antennas and reduced processing capability;
2. As shown in step 310 of FIG. 3 the gNB 170 assigns a preset to each UE and shares the assigned preset information to UE. If the presets of PDCCH candidates are indexed, the index is sent to UE in order to efficiently share the preset assignment:
    To reduce PDCCH blocking, when gNB, e.g., decides to use the same min AL for several UEs, it should try to distribute the subsets among the UEs so that PDCCH blocking is minimized. For instance, when the total I UE devices indexed by i∈[1, I] decide to use the same min AL having M presets, the preset assigned to UE n, $m_i \in [1, M]$, can be determined by using a function '$m_i = ((i-1) \bmod M) + 1$' where mod is a modulo operation, where I and M are integers,
    To support multiple PDCCH in one TTI, gNB can assign multiple candidate presets to one UE,
    gNB 170 shares the preset by using the following options:
        RRC: For a UE in RRC CONNECTED, the network can use system information to provide the index of the assigned candidate preset through the dedicated signaling. For example, the RRC Reconfiguration message can be used if the UE has an active BWP with no common search space configured to monitor system information,
        MAC Control Element (MAC CE): It is possible to add a field about the index of the assigned PDCCH candidate preset at the new Logical Channel ID (LCID) field. A new LCID index needs to be assigned to represent the preset information, and the LCID values can include the index of PDCCH candidate preset where the size of LCID values depend on the total number of candidate preset, and
        DCI: Two-step DCI is used to inform UE 110 of the preset information. For instance, UE 110 initially receives a compact version of the first DCI about the location of the assigned preset. Then, UE knows the location of the assigned preset. After that, gNB 170 generates the second DCI including the full version of DCI. The second DCI is finally sent to UE by using the assigned preset;
3. As shown in step 315 of FIG. 3 the gNB 170 decides early-stopping indicator. To reduce energy consumption for BD process, a RedCap criteria is informed to UE 110 as an 'early-stopping indication' of BD. Once the early-stopping indicator is set, BD is stopped by UE 110 after the UE successfully decodes PDCCH from the assigned preset;
4. As shown in step 320 of FIG. 3 the UE 110 reports the channel condition CQI;
5. As shown in step 325 of FIG. 3 PDCCH is used to carry the DCI indicating the DL/UL resources for PDSCH/PUSCH;
6. From the assigned candidates, UE 110 decodes PDCCH and read the DCI information on the scheduled resource allocation of PDSCH/PUSCH. For each assigned preset, UE 110 can optimize the order of BD attempts considers UE signal quality. For example, as shown in step 330 of FIG. 3 the UE 110 first attempts to perform BDs from the estimated AL (or previous AL if BD history is available). Also, if UE 110 fails to decode the PDCCH from the preset, UE 110 continues to decode the PDCCH by checking all other candidate sets in the next PDCCH monitoring occasion;
7. If the DCI is decoded by using the candidate other than the assigned preset, UE 110 may assume that the current knowledge on the preset assignment is outdate UE triggers gNB to assign a new preset of PDCCH candidates. Also, UE 110 requests gNB 170 to update a preset;
    As shown in optional step 335 of FIG. 3 if BDs are completed with the PDCCH candidate outside of the assigned preset, UE 110 requests gNB 170 to modify candidate preset for the (re)transmissions in the future; and
8. As shown in optional step 340 of FIG. 3 if gNB 160 does not receive any ACK message from UE 110, gNB 170 assumes that UE 110 fails to receive the DCI. gNB 170 assigns a new preset of candidates to retransmit the DCI.

Figure 5A:
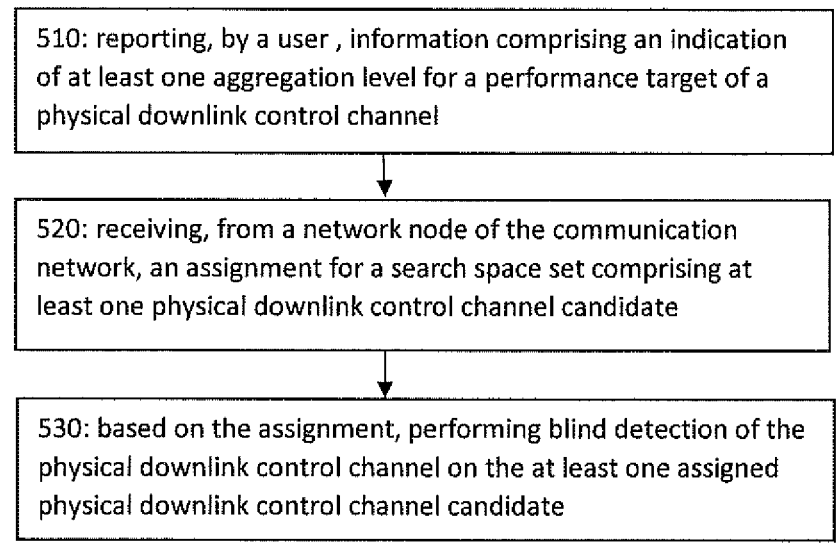
FIG. 5A and FIG. 5B each show a method in accordance with example embodiments of the invention which may be performed by an apparatus such as shown in FIG. 4.
Figure 5B:
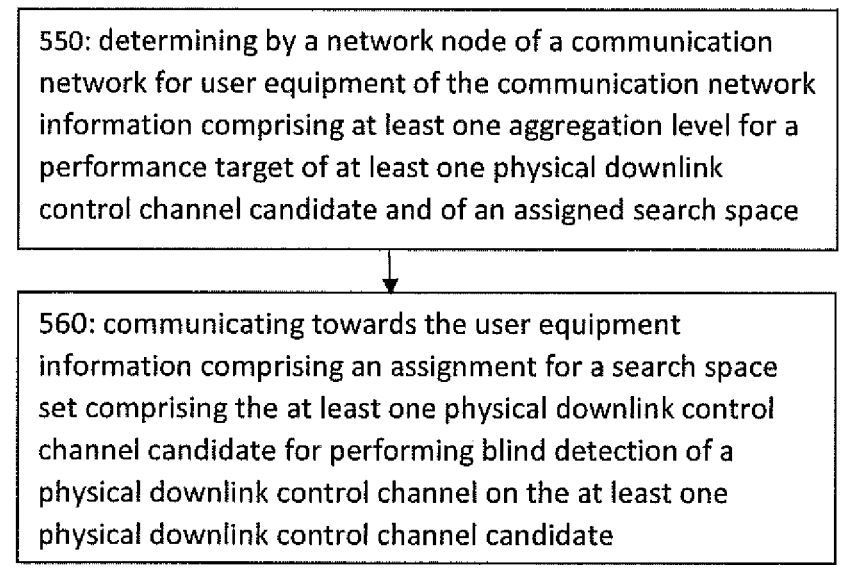

FIG. 5A and FIG. 5B each show a method in accordance with example embodiments of the invention which may be performed by an apparatus such as shown in FIG. 4.

FIG. 5A illustrates operations which may be performed by a device such as, but not limited to, a device (e.g., the UE 110 as in FIG. 4). As shown in step 510 of FIG. 5A there is reporting, by the apparatus, information comprising an indication of at least one aggregation level for a performance target of a physical downlink control channel. As shown in step 520 of FIG. 5 there is receiving, from a network node of the communication network, an assignment for a search space set comprising at least one physical downlink control channel candidate. Then as shown in step 530 of FIG. 5A there is, based on the assignment, performing blind detection of the physical downlink control channel on the at least one assigned physical downlink control channel candidate.

In accordance with the example embodiments as described in the paragraph above, wherein the user equipment comprises a reduced capability user equipment.

In accordance with the example embodiments as described in the paragraphs above, wherein the at least one aggregation level comprises a minimum aggregation level, and wherein the assigned search space set comprising the at least one physical downlink control channel candidate is based on the minimum aggregation level.

In accordance with the example embodiments as described in the paragraphs above, wherein the performance target is based on at least one of: a minimum aggregation level corresponding to target block error ratio on a narrowband physical downlink control channel, or a number of repetitions corresponding to target block error ratio on a physical downlink control channel.

In accordance with the example embodiments as described in the paragraphs above, wherein at least one control resource set for performing blind detection of the physical downlink control channel on the at least one physical downlink control channel candidate is not larger than an available bandwidth of the user equipment.

In accordance with the example embodiments as described in the paragraphs above, wherein the assigned search space set comprises one subset of mutually exclusive subsets, and wherein based on the minimum aggregation level, the mutually exclusive subsets are predetermined from the network node.

In accordance with the example embodiments as described in the paragraphs above, wherein the mutually exclusive subsets are statically partitioned in the at least one physical downlink control channel candidate.

In accordance with the example embodiments as described in the paragraphs above, wherein the mutually exclusive subsets comprise at least one candidate predetermined set for the user equipment.

In accordance with the example embodiments as described in the paragraphs above, wherein the at least one candidate predetermined set comprises at least one of at least one deterministic predetermined set or at least one randomized predetermined set assigned to the user equipment.

In accordance with the example embodiments as described in the paragraphs above, wherein the at least one deterministic predetermined set comprises a static partitioning of physical downlink control channel candidates independent of the user equipment.

In accordance with the example embodiments as described in the paragraphs above, wherein the at least one deterministic predetermined set is identified for different control channel elements of the at least one aggregation level.

In accordance with the example embodiments as described in the paragraphs above, wherein the at least one randomized predetermined set allows the user equipment to add a random number of adjacent candidates such that the user equipment can interpret the candidates included in the at least one candidate predetermined set.

In accordance with the example embodiments as described in the paragraphs above, wherein the at least one randomized predetermined set is defined using a random variable N.

In accordance with the example embodiments as described in the paragraphs above, wherein the blind detection increases with an increment of a realization value of the random variable N.

In accordance with the example embodiments as described in the paragraphs above, wherein the blind detection comprises receiving from the network node a delta signal informing the user equipment to use the at least one randomized predetermined set with a preceding (−1) or a following (+1) index compared to a previous predetermined set used by the user equipment.

In accordance with the example embodiments as described in the paragraphs above, there is identifying the at least one physical downlink control channel candidate in the assigned search space set that are valid for the user equipment.

In accordance with the example embodiments as described in the paragraphs above, wherein the identifying is using at least one of: a hash function, a common predetermined set mapping assigned by the network node as determined by the user equipment, an index of the mutually exclusive subsets determined by the user equipment, a logical channel identifier associated with a medium access control element, a downlink control indicator, or system information.

In accordance with the example embodiments as described in the paragraphs above, wherein the user equipment comprises a reduced capability user equipment, and wherein the at least one non-transitory memory and the computer program code are configured, with the at least one processor, to cause the apparatus to set an early-stopping indicator for blind detection running on the user equipment.

In accordance with the example embodiments as described in the paragraphs above, wherein once the early-stopping indicator is set blind detection is stopped by the user equipment after the user equipment successfully decodes the at least one physical downlink control channel candidate from the at least one candidate predetermined set.

A non-transitory computer-readable medium (Memory (ies) 125 as in FIG. 4) storing program code (Computer Program Code 123 and/or Search Space Module 140-2 as in FIG. 4), the program code executed by at least one processor (Processors 120 and/or Search Space Module 140-1 as in FIG. 4) to perform the operations as at least described in the paragraphs above.

In accordance with an example embodiment of the invention as described above there is an apparatus comprising: means for reporting (one or more transceivers 130, Memory (ies) 125, Computer Program Code 123 and/or Search Space Module 140-2, and Processor(s) 120 and/or Search Space Module 140-1 as in FIG. 4), by the apparatus (UE 110 as in FIG. 4) of a communication network (network 100 as in FIG. 4), information comprising an indication of at least one aggregation level for a performance target of a physical downlink control channel; means for receiving (one or more transceivers 130, Memory(ies) 125, Computer Program Code 123 and/or Search Space Module 140-2, and Processor (s) 120 and/or Search Space Module 140-1 as in FIG. 4), from a network node (eNB/gNB 170 as in FIG. 4) of the communication network, an assignment for a search space set comprising at least one physical downlink control channel candidate; and means, based on the assignment, for performing (one or more transceivers 130, Memory(ies) 125, Computer Program Code 123 and/or Search Space Module 140-2, and Processor(s) 120 and/or Search Space Module 140-1 as in FIG. 4) blind detection of the physical downlink control channel on the at least one assigned physical downlink control channel candidate.

In the example aspect of the invention according to the paragraph above, wherein at least the means for reporting, receiving, and reporting comprises a non-transitory computer readable medium [Memory(ies) 125 as in FIG. 4] encoded with a computer program [Computer Program Code 123 and/or Search Space Module 140-2 as in FIG. 4] executable by at least one processor [Processor(s) 120 and/or Search Space Module 140-1 as in FIG. 4].

FIG. 5B illustrates operations which may be performed by a network device such as, but not limited to, a network node eNB/gNB 170 as in FIG. 4 or a base station. As shown in step 550 of FIG. 4 there is determining by a network node of a communication network for user equipment of the communication network information comprising at least one aggregation level for a performance target of at least one physical downlink control channel candidate and of an assigned search space set. Then as shown in step 560 of FIG. 4 there is communicating towards the user equipment information comprising an assignment for a search space set comprising the at least one physical downlink control channel candidate for performing blind detection of a physical downlink control channel on the at least one physical downlink control channel candidate.

In accordance with the example embodiments as described in the paragraph above, wherein the user equipment comprises a reduced capability user equipment.

In accordance with the example embodiments as described in the paragraphs above, wherein the at least one aggregation level comprises a minimum aggregation level, and wherein the assigned search space set comprises the at least one physical downlink control channel candidate and is based on the minimum aggregation level.

In accordance with the example embodiments as described in the paragraphs above, wherein at least one control resource set for the at least one physical downlink control channel candidate is not larger than an available bandwidth of the user equipment.

In accordance with the example embodiments as described in the paragraphs above, wherein the assigned search space set comprises one of the mutually exclusive subsets, and wherein based on the minimum aggregation level, the mutually exclusive subsets are predetermined at the network node.

In accordance with the example embodiments as described in the paragraphs above, wherein the mutually exclusive subsets are statically partitioned in the at least one physical downlink control channel candidate.

In accordance with the example embodiments as described in the paragraphs above, wherein the mutually exclusive subsets comprise at least one candidate predetermined set for the user equipment.

In accordance with the example embodiments as described in the paragraphs above, wherein the at least one candidate predetermined set comprises at least one of at least one deterministic predetermined set or at least one randomized predetermined set assigned to the user equipment.

In accordance with the example embodiments as described in the paragraphs above, wherein the at least one deterministic predetermined set comprise a static partitioning of the at least one physical downlink control channel candidate independent of the user equipment.

In accordance with the example embodiments as described in the paragraphs above, wherein the at least one deterministic predetermined set is identified for different control channel elements of the at least one aggregation level.

In accordance with the example embodiments as described in the paragraphs above, wherein the at least one randomized predetermined set allows the user equipment to add a random number of adjacent candidates such that the user equipment can interpret the candidates included in the at least one candidate predetermined set.

In accordance with the example embodiments as described in the paragraphs above, wherein the at least one randomized predetermined set is defined using a random variable N.

In accordance with the example embodiments as described in the paragraphs above, wherein the blind detection comprises sending by the network node to the user equipment signaling comprising a delta signal informing the user equipment to use the at least one randomized predetermined set with a preceding (−1) or a following (+1) index compared to a previous predetermined set used by the user equipment.

In accordance with the example embodiments as described in the paragraphs above, wherein based on the signaling the network node can schedule downlink control information preceding or following the at least one randomized predetermined set without the need for user equipment to blind detect all possible candidates.

A non-transitory computer-readable medium (Memory (ies) 155 as in FIG. 4) storing program code (Computer Program Code 153 and/or Search Space Module 150-2 as in FIG. 4), the program code executed by at least one processor (Processors 152 and/or Search Space Module 150-1 as in FIG. 4) to perform the operations as at least described in the paragraphs above.

In accordance with an example embodiment of the invention as described above there is an apparatus comprising: means for determining (one or more transceivers 160, Memory(ies) 155, Computer Program Code 153 and/or Search Space Module 150-2, and Processor(s) 120 and/or Search Space Module 150-1 as in FIG. 4) by a network node (eNB/gNb 170 as in FIG. 4) of a communication network (Network 100 as in FIG. 4) for user equipment (UE 110 as in FIG. 4) of the communication network information comprising at least one aggregation level for a performance target of at least one physical downlink control channel candidate and of an assigned search space set; and means for communicating (one or more transceivers 160, Memory(ies) 155, Computer Program Code 153 and/or Search Space Module 150-2, and Processor(s) 120 and/or Search Space Module 150-1 as in FIG. 4) towards the user equipment information comprising an assignment for a search space set comprising the at least one physical downlink control channel candidate for performing blind detection of a physical downlink control channel on the at least one physical downlink control channel candidate.

In the example aspect of the invention according to the paragraph above, wherein at least the means for determining and communicating comprises a non-transitory computer readable medium [Memory(ies) 155 as in FIG. 4] encoded with a computer program [Computer Program Code 153 and/or Search Space Module 150-2 as in FIG. 4] executable by at least one processor [Processor(s) 152 and/or Search Space Module 150-1 as in FIG. 4].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
  (a) hardware-only circuit implementations (such as implementations in only analog and/or digital circuitry);
  (b) combinations of hardware circuits and software, such as (as applicable):
    (i) a combination of analog and/or digital hardware circuit(s) with software/firmware; and
    (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
  (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one non-transitory memory storing instructions that when executed by the at least one processor cause the apparatus to at least:
   report, by the apparatus, information comprising an indication of at least one aggregation level for a performance target of a physical downlink control channel;
   receive, from a network node of a communication network, an assignment for a search space set comprising at least one physical downlink control channel candidate,
   wherein the performance target is based on at least one of: a minimum aggregation level corresponding to target block error ratio on a narrowband physical downlink control channel, or a number of repetitions corresponding to target block error ratio on a physical downlink control channel; and
   based on the assignment, perform blind detection of the physical downlink control channel on the at least one assigned physical downlink control channel candidate.

2. The apparatus of claim 1, wherein the apparatus comprises a reduced capability user equipment.

3. The apparatus of claim 1, wherein the at least one aggregation level comprises a minimum aggregation level, and wherein the assigned search space set comprising the at least one physical downlink control channel candidate is based on the minimum aggregation level.

4. The apparatus of claim 1, wherein at least one control resource set for performing blind detection of the physical downlink control channel on the at least one physical downlink control channel candidate is not larger than an available bandwidth of the apparatus.

5. The apparatus of claim 3, wherein the assigned search space set comprises one subset of mutually exclusive subsets, and wherein the mutually exclusive subsets are predetermined from the network node.

6. The apparatus of claim 5, wherein the mutually exclusive subsets are statically partitioned in the at least one physical downlink control channel candidate.

7. The apparatus of claim 5, wherein the mutually exclusive subsets comprise at least one candidate predetermined set for the apparatus.

8. The apparatus of claim 7, wherein the at least one candidate predetermined set comprises at least one of at least one deterministic predetermined set or at least one randomized predetermined set assigned to the apparatus.

9. The apparatus of claim 8, wherein the at least one deterministic predetermined set comprises a static partitioning of physical downlink control channel candidates independent of the apparatus.

10. The apparatus of claim 8, wherein the at least one deterministic predetermined set is identified for different control channel elements of the at least one aggregation level.

11. The apparatus of claim 8, wherein the at least one randomized predetermined set allows the apparatus to add a random number of adjacent candidates such that the apparatus can interpret the candidates included in the at least one candidate predetermined set.

12. The apparatus of claim 8, wherein the at least one randomized predetermined set is defined using a random variable N.

13. The apparatus of claim 12, wherein the blind detection increases with an increment of a realization value of the random variable N.

14. The apparatus of claim 8, wherein the blind detection comprises receiving from the network node a delta signal informing the apparatus to use the at least one randomized predetermined set with a preceding (−1) or a following (+1) index compared to a previous predetermined set used by the apparatus.

15. A method, comprising:
    reporting, by a user, information comprising an indication of at least one aggregation level for a performance target of a physical downlink control channel,
    wherein the performance target is based on at least one of: a minimum aggregation level corresponding to target block error ratio on a narrowband physical downlink control channel, or a number of repetitions corresponding to target block error ratio on a physical downlink control channel;
    receiving, from a network node of the communication network, an assignment for a search space set comprising at least one physical downlink control channel candidate; and
    based on the assignment, performing blind detection of the physical downlink control channel on the at least one assigned physical downlink control channel candidate.

* * * * *